United States Patent [19]

Zeblisky

[11] 4,076,618

[45] Feb. 28, 1978

[54] TREATMENT OF LIQUIDS CONTAINING COMPLEXED HEAVY METALS AND COMPLEXING AGENTS

[75] Inventor: Rudolph J. Zeblisky, Hauppauge, N.Y.

[73] Assignee: Photocircuits Division of Kollmorgen Corporation, Glen Cove, N.Y.

[21] Appl. No.: 703,969

[22] Filed: Jul. 9, 1976

[51] Int. Cl.$^2$ .................... B01D 15/04; B01D 15/06
[52] U.S. Cl. ............... 210/30 R; 210/38 B; 260/583 N
[58] Field of Search .......... 75/101 BE; 210/24, 30 R, 210/32, 34, 37 B, 38 B; 423/24, 139; 427/305, 404; 260/429 BQ, 429 J, 438.1, 583 N

[56] References Cited

U.S. PATENT DOCUMENTS

| | | | |
|---|---|---|---|
| 3,003,866 | 10/1961 | Mattano et al. | 210/38 B |
| 3,075,855 | 1/1963 | Agens | 427/404 |
| 3,119,709 | 1/1964 | Atkinson | 427/305 |
| 3,148,947 | 9/1964 | Fleischmann | 423/24 |
| 3,558,288 | 1/1971 | Burrows | 423/24 |
| 3,658,470 | 4/1972 | Zievers et al. | 210/37 B |
| 3,882,018 | 5/1975 | Depree | 210/38 B |
| 3,998,627 | 12/1976 | Weir et al. | 423/24 |

*Primary Examiner*—Thomas G. Wyse
*Assistant Examiner*—Ivars Cintins
*Attorney, Agent, or Firm*—Morgan, Finnegan, Pine, Foley & Lee

[57] ABSTRACT

Methods are provided for separating by-products from alkanolamine complexing agents and heavy metals complexed with alkanolamines, and for the waste-treating of solutions containing such complexed heavy metals and complexing agents. Illustratively, the pH of an electroless metal deposition bath or bath effluent which contains an alkanolamine complexing agent and an alkanolamine-complexed heavy metal is adjusted to render the complexing agent and complexed heavy metal extractable by an ion exchange medium, the pH-adjusted bath liquid is contacted with an ion-exchange medium capable of extracting the complexed heavy metal and complexing agent, the contacted bath liquid, which contains by-products and is substantially free of the complexed heavy metal and the complexing agent is removed from the ion exchange medium and the complexed heavy metal and complexing agent are recovered from the exchange medium for further use in electroless metal deposition baths.

34 Claims, No Drawings

TREATMENT OF LIQUIDS CONTAINING COMPLEXED HEAVY METALS AND COMPLEXING AGENTS

Electroless metal deposition bath by-products such as alkali metal salts, e.g., sodium formate, sodium sulfate, and the like, are separated from alkanolamine complexing agents and heavy metals complexed with such agents, in an electroless metal deposition bath, or bath effluent, by adjustment of the pH and extraction with an ion exchange medium, and the extracted comlexed heavy metals and complexing agents are removed from the exchange medium and returned to the electroless metal deposition operation. This results in a continuously operating electroless metal deposition bath from which by-products of the deposition process are removed, and from which heavy metals and complexing agents are not discharged as pollutants. Optionally, in batch-wise metal deposition operations, the extracted heavy metal and complexing agent can be recovered from the exchange medium and, instead of being returned directly to metal deposition, prepared as a concentrate for future use in other metallizing operations.

In another embodiment, solutions of alkanolamine complexing agents and alkanolamine-complexed heavy metals, e.g., metal cleaning solutions, electroplating baths, etchant solutions, and the like, are treated by the afore-mentioned pH-adjustment and contact with an ion exchange medium to remove the complexed heavy metal and complexing agents from solution, thus preventing their discharge as pollutants and enabling reuse of these materials if desired.

BACKGROUND OF THE INVENTION

Complexing agents are widely used in a variety of liquid media to form complex species or chelates with metals. Complexing agents are employed in metal cleaning solutions, metal etchants, electroplating baths and electroless metal deposition baths, as well as other liquid compositions.

By way of illustration, particular reference is made to electroless metal deposition, a well known means for forming adherent layers of metal on non-metallic surfaces. This generally involves treating a catalyzed surface with an electroless metal deposition bath, which is typically prepared by admixing water, an alkali pH adjuster, a water soluble salt of the metal to be deposited, such as the sulfate, chloride, nitrate, acetate, etc., a reducing agent for the metal, a complexing agent for the metal, and, usually, a wetting agent. Some examples of electroless metal deposition baths are disclosed, for instance, in U.S. Pat. Nos. 3,119,709 and 3,075,855.

It is known that bath life can be prolonged and bath performance can be maintained at desired levels of activity by replenishing from time to time bath ingredients which are consumed during electroless metal deposition. However, bath operation also results in the formation of by-products, e.g., alkali metal salts, which accumulate in the bath and eventually reach amounts that interfere with the electroless metallizing process. For example, the physical properties of deposited metals are inferior when high concentrations of such by-products are present in the bath and, in addition, maintenance of bath stability becomes more difficult.

Thus, when relatively large amounts of by-products are present in an electrical metal deposition bath, the bath usually must either be discharged or some adjustment must be made to the bath to enhance bath performance and to prolong its useful life. Adjustment is made, for instance, by diluting the bath with additional amounts of water to reduce the concentration of by-products in the bath, or by adding dilute amounts of consumable bath ingredients. Even with these adjustments, however, at least some of the bath must be disposed of, i.e., overflow resulting from additions to the bath.

Therefore, with any of the above methods, bath ingredients which are not normally used up, such as undeposited heavy metals and complexing agents, will be lost when the bath or its overflow are discharged. For example, in electroless copper baths anywhere from 5 percent to as much as 50 percent of the original amount of copper is not deposited. In addition, during the electroless metal deposition process, complexing agents are not consumed, but function merely as intermediaries in assisting the transfer of metal from the bath to the substrate being metallized. Thus, substantially all of the original amounts of complexing agent remains in the bath even after deposition is completed.

These ingredients, i.e., complexing agents and undeposited metals, are often expensive. It is desirable, therefore, to recover them for further use in electroless metal deposition baths. Moreover, conventional waste treatment systems are unsuitable for treating plant effluents which contain complexed heavy metals, which are found in discharges from electroless metallizing processes for instance. This is because waste treatment typically involves adjusting the pH of waste liquids to precipitate metals as insoluble salts, which are then filtered or allowed to settle. However, the presence of complexing agents for the metals usually prevents the formation of such precipitates during waste treatment.

Similar difficulties in waste treatment occur, of course, with other liquid media which contain complexing agents and complexed metal species, such as the above-mentioned metal cleaning solutions, etching solutions and electroplating baths. Although the use of these solutions normally does not involve the separation of by-products from complexed metals, as is desirable in electroless metal deposition, it is desirable for purposes of effective waste treatment and disposal to remove the complexed metals and complexing agents from such solutions prior to their dicharge into conventional waste treatment systems.

There has now been discovered a method which is broadly applicable to the separation of deposition by-products from complexed metals in electroless metal deposition operations, as well as to the waste treatment of solutions of complexed metals and complexing agents. More particularly, it has been surprisingly discovered that alkanolamine complexing agents and complex species of heavy metals and such agents can be removed from solutions by a method which involves pH adjustment and contacting with an ion exchange medium. This discovery is quite unexpected, in view of the fact that many other complexing agents can not be removed in any appreciable quantities under the same conditions.

Accordingly, it is an object of this invention to provide a method of operating an electroless metal deposition bath wherein alkanolamine complexing agents and heavy metals complexed therewith are separated from deposition by-products recovered in reusable form and, in continuously operating systems, returned to an electroless metal deposition bath for further use.

It is a further object of the invention to provide a method of treating solutions containing alkanolamine complexing agents and complexes of heavy metals and alkanolamine complexing agents to readily remove them from the solutions.

These and other objects of this invention will be apparent to those skilled in the art from the following description.

DESCRIPTION OF THE INVENTION

As it applies to electroless metal deposition, the invention comprises a method of separating by-products of an electroless metal deposition bath from an alkanolamine complexing agent and a complex species of heavy metal and an alkanolamine complexing agent and a complex species of heavy metal and an alkanolamine complexing agent in the bath, the method comprising:

a. adjusting the pH of the bath or bath effluent to render the alkanolamine-complexed heavy metal and the alkanolamine complexing agent extractable by an ion exchange medium;

b. contacting the pH-adjusted bath liquid of step (a) with an ion exchange medium capable of extracting said complexed heavy metal and said complexing agent from the pH-adjusted bath liquid;

c. removing from the ion exchange medium a bath liquid which comprises said metal deposition by-products and which is substantially free of said complexed heavy metal and said complexing agent;

d. removing said complexed heavy metal and said complexing agent from the ion exchange medium, and e. returning said complexed heavy metal and said complexing agent to an electroless metal deposition bath.

The above procedure is broadly applicable to batchwise electroless metal deposition baths and electroless baths which are operated continuously for prolonged periods of time, i.e., so-called continuous electroless metal baths.

In another embodiment of the invention, a method is provided by separating by-products of an electroless metal deposition bath from alkanolamine complexing agents and complex species of heavy metals and alkanolamine complexing agents in an electroless metal deposition bath, the method comprising:

a. adjusting the pH of the bath or bath effluent to render the alkanolamine-complexed heavy metal and the alkanolamine complexing agent extractable by an ion exchange medium;

b. contacting the pH-adjusted bath liquid of step (a) with an ion exchange medium capable of extracting said complexed heavy metal and said complexing agent from the pH-adjusted bath liquid;

c. removing from the ion exchange medium a bath liquid which comprises said metal deposition by-products and which is substantially free of said complexed heavy metal and said complexing agents; and d. removing said complexed heavy metal and said complexing agent from the ion exchange medium.

In carrying out the methods of the invention mentioned above, the electroless metal deposition bath or bath effluent is preferably adjusted to a pH of less than about 11 during step (a), and more preferably, from about 3 to about 7.5. This will usually involve the addition of acid, since electroless metal deposition baths are typically operated under alkaline conditions, at relatively high values of pH, e.g., 11–14. Particular values for pH for step (a) will, of course, vary depending on the metals and/or complexing agents employed in the bath, the overall composition of the bath, and other operating conditions.

By means of pH-adjustment, the alkanolamine-complexed heavy metals and alkanolamine complexing agents are rendered readily extractable by ion exchange media which are not otherwise capable of removing these materials from solution. This is most surprising because when similar procedures are carried out with solutions comprising heavy metals which are complexed with non-alkanolamine complexing agents, subsequent contact of the pH-adjusted solutions does not result in the extraction of any appreciable amounts of the non-alkanolamine complexed heavy metals. For example, when solutions of copper complexed with each of ethylenediaminetetraacetic acid (EDTA), diethylenetriaminepentaacetic acid (DTPA), N-hydroxyethylenediaminetriacetic acid (HEDTA), N-2-hydroxyethyliminodipropianic acid, N-3-hydroxypropyliminodiacetic acid, N-hydroxyethyliminodiacetic acid and N,N-dihydroxyethylglycine acid are adjusted to a pH of 5, for instance, and passed through an ion exchange resin column, no appreciable amounts of the copper complex are retained on the column. On the other hand, when solutions of copper complexed with various alkanolamine complexing agents at pH 5 are passed through, substantially all of the complexed copper and excess, free complexing agent are retained.

The electroless metal deposition bath or bath effluent to be treated by the method of the invention will preferably have an alkali metal concentration of less than about 1.5 molar, usually indicated by a specific gravity of less than 1.075. At values of specific gravity greater than this, some reduced capacity in the exchange medium for the complexed metals and complexing agents may be experienced. Dilutions with water can be made to the bath liquid, if necessary, to obtain the desired range of specific gravity of less than 1.075 before separation is carried out.

The ion exchange medium in step (b) can include cation exchange resins, ion exchange resins having a chelating functionality, liquid ion exchangers, and the like. Especially preferred are cation exchange resins which comprise a polystyrene resin with a —$SO_3^-$ ionic group, and carboxylic exchange resins with a chelating functionality. The ion-exchanged bath liquid from step (b) will comprise by-products of the electroless metal deposition bath, e.g., formates, sulfates, chlorides, and the like, and will be substantially free of alkanolamine-complexed heavy metals and alkanolamine complexing agents, which are retained by the exchange medium.

The removal of the complexed heavy metals and complexing agents from the exchange medium can be effectively carried out in various ways. For example, the complexing agent and metal can be recovered using an alkaline metal hydroxide solution. Such a solution will not contribute salt forming anions, e.g., sulfates, chlorides, formates, and the like, to the recovered metals and complexing agents, which is desirable if the metal and complexers are to be returned to an electroless metal deposition bath. The complexing agent and metal can also be recovered separately from the exchange medium by using solvents specific to the removal of either the metals or complexing agents, but not both. This can be done most conveniently when the complexed heavy metals and complexing agents are to be removed from chelating exchange resins.

Alternatively, both the metal and complexing agent can be removed from the exchange medium together, such as, for example, when these materials are to be removed from a cation exchange resin. The cation exchanged complexed metals and complexing agents are removed from the exchange medium by eluting the resin with an alkaline solution of a pH of 10 or above, or a strong acid or sodium salt solution. The complexed metal in the resulting effluent can then be treated to separate the metal from complexing agent by adding a strong reducing agent, e.g., sodium borohydride, to reduce the metal which precipitates in elemental form. The complexing agent is then recovered by adjusting the pH of the effluent, e.g., to a value of from 3 to 7.5, passing it through a cation exchange resin, which retains the complexing agent, and washing the resin with an alkaline solutin to remove the complexing agent.

The electroless metal deposition bath will preferably comprise an alkanolamine complexing agent or agents. Examples include N, N, N', N'-tetrakis-(2-hydroxypropyl)-ethylenediamine, hereinafter referred to as THPED, triethanolamine, ethylenedinitrilotetraethanol, nitrilo-tri-2-propanol, tetrahydroxyethylethylene-diamine, monohydroxyethyl-trihydroxypropylethylenediamine, or mixtures of any of the foregoing. Especially preferred is THPED.

The deposition bath will also comprise a heavy metal or metal alloy. The metals can be selected from copper, cobalt, nickel, chromium, iron, cadmium, gold and the like. Copper, nickel and cobalt are preferred. Especially preferred is copper.

The amount of complexer charged to the deposition bath may range broadly, e.g., from 1 to 20 moles or more per mole of hevy metal, such as copper, in the starting bath. However, the complexing agent is preferably in substantial excess above the quantity required for complexing all of the metal or metals in the initial deposition bath. Such an excess ensures that there will be an ample amount of free or available complexing agent capable of dissolving the metals.

Other conventional components of the electroless metal deposition bath include aqueous formaldehyde as a reducing agent, usually preferred over other known reducers, including borohydrides, aminoboranes, etc.; small quantities of stabilizers against bath decomposition; sodium or other alkali metal hydroxide to provide an alkaline pH of preferably about 11 to 13.5 or 14, and a small amount, e.g., 0.001 to 1% of a wetting agent of the types stable at high pH values. Small quantities of other metals such as nickel, tin, vanadium, antimony, arsenic, molybdenum, etc. may also be included to enhance deposit qualities and as bath stabilizers.

As applied to the treatment of solutions in general containing alkanolamine complexing agents and complex species of heavy metals and alkanolamine complexing agents, the method comprises:

a. adjusting the pH of said solution to render the alkanolamine-complexed heavy metal and the alkanolamine complexing agent extractable by an ion exchange medium;

b. contacting the pH-adjusted solution of step (a) with an ion exchange medium capable of extracting said complexed heavy metal and said complexing agent from the pH-adjusted bath liquid;

c. discharging from the ion exchange medium a liquid which is substantially free of said complexed heavy metal and said complexing agent; and d. regenerating the ion exchange medium.

Within the method of waste-treatment broadly described above, the pH is preferably adjusted to a value of below about 11 and, more preferably, from about 3 to about 7.5. Suitable ion exchange media are as described above.

The ion exchange medium can be regenerated by contacting the medium with a strong alkaline solution, e.g., a pH of 10 or above, or a strong acid or sodium salt solution. The regenerating step will normally also result in removal of substantially all of the complexed metal and complexing agent retained by the exchange medium.

The above method of treatment is broadly applicable for the removal of a variety of alkanolamine-complexed heavy metals, such as those mentioned above, e.g., copper, cobalt, nickel, and the like, from a broad variety of liquid media, e.g., metal cleaning solutions, etching solutions, electroplating solutions, and others, which will be apparent to those skilled in the art.

The invention is further illustrated by the following examples. These are set forth for illustrative purposes only, and are not to be construed as limiting.

EXAMPLE 1

A 60-liter electroless copper bath was prepared by admixing the following:

| | |
|---|---|
| Cu SO$_4$ . 5H$_2$O | 10 g/l |
| THPED* | 17 ml/l |
| Formaldehyde (37% solution) | 15 ml/l |
| NaCN | 30 mg/l |
| Wetting agent** | 1 mg/l |
| Water and NaOH (to volume and pH 12.8) | |

*Quadrol, commercially available from BASF-Wyandotte Co.
**Pluronic P-85 (BASF-Wyandotte Co.)

The bath had an initial specific gravity of 1.030. The temperature of the bath was adjusted to 28° C., and a filtration/circulation rate of 8 bath volumes/hour was employed. Using a plating surface area of 250 cm$^2$/l, the bath was operated with continuous analysis and additions to maintain the bath composition. As plating proceeded the specific gravity increased, primarily due to the build-up of sodium formate and sodium sulfate. When the bath density reached 1.071, bath solution was withdrawn with a pump at the rate of 1.7 liters per hour. The pH was reduced by the addition of sulfuric acid and controlled at a pH of between pH 5 and pH 6.

The solution was then passed through two cation exchange columns in series. Each ion exchange column was 127 cm. high and 11 cm. in diameter and contained 5.6 liters of Amberlite IR-120 Plus, a polystyrene cation exchange resin with —SO$_3$ $^-$ functional groups, commercially available from Rohm & Haas Company. Most of the Cu-THPED complex and the free THPED originally in the bath liquid were retained on the ion exchange resin of the first column. The process was continued until the first column was saturated with copper and THPED (about 10 hours, or after 17 liters of bath liquid were treated).

The effluent from the two ion exchange columns contained primarily sodium sulfate, sodium formate and smaller amounts of other by-products from the electroless copper bath, and only trace amounts of copper and THPED. The trace amounts of copper and THPED were removed by passing the effluent through a column packed with 5.6 liters of Amberlite XE-318, a carboxylic acid exchange resin with chelating functionality, a commercially available from Rohm & Haas Co.

Simultaneously, copper, THPED and NaOH were added to the operating bath by pumping 0.9 liters per hour of a 5 percent aqueous solution of sodium hydroxide through a fourth ion exchange column containing 5.6 liters of Amberlite IR-120 Plus which had been previously charged with copper and THPED.

This bath addition was continued until the first column was saturated with copper and THPED, resulting in a return to the bath of about 9 liters over a 10-hour period. The difference in volume between bath solution withdrawn and copper THPED sodium hydroxide solution added to the bath was made up by additions of water and chemicals to maintain bath composition.

The cycle was repeated by rinsing the columns with water and then replacing the first column with the second column, the second column with the fourth column and the fourth column with the first column. The third column was periodically regenerated first with sodium hydroxide and the effluent solution returned to the electroless copper bath. It was further regenerated with a 5% solution of sulfuric acid.

With this system the electroless copper deposition bath reaction products were removed from the bath and a stable condition in the bath was maintained, resulting in consistent plating results, no wasted bath, and reduced environmental pollutants from the metallizing operation.

EXAMPLE 2

A waste electroless copper bath initially containing THPED, copper sulfate, formaldehyde, sodium hydroxide, and sodium formate and sodium sulfate by-products was treated as follows:

The pH of the bath was lowered to 5.5 with sulfuric acid. Approximately 40 liters of the waste bath solution were passed through an ion exchange column 32 inches high and containing 9 liters of Amberlite IR-120 Plus cation exchange resin. The flow rate through the column was 130 ml/min., providing a resin-solution contact time of 30 minutes. The copper-THPED and THPED components of the waste bath were retained on the cation exchange resin. The other bath components, e.g., sodium formate, sodium sulfate, etc., passed through the system and were discarded.

Copper and THPED were removed from the resin by circulating 5 gallons of a 5 percent solution of sodium hydroxide in water through the resin column. The resultant solution contained copper in an amount equivalent to 16.8 g/l copper sulfate pentahydrate and 31.1 g/l THPED. This solution was used to supply the copper and THPED to make an electroless copper bath according to Example 1. The resultant electroless copper deposition bath operated normally, indicating that the reclaimed copper and THPED were in usable form.

EXAMPLE 3

The procedure of Example 1 is repeated, using an electroless copper bath prepared by admixing the following:

| | |
|---|---|
| $CuCl_2 \cdot 2H_2O$ | 15 g/l |
| Triethanolamine | 50 ml/l |
| Formaldehyde (37% solution) | 25 ml/l |
| $NH_4OH$ | 16 g/l |

The above bath is operated continuously over a period of several hours, or until an appreciable build-up of by-products, such as sodium chloride, occurs. The bath is then treated by the procedure described in Example 1, to recover triethanolamine and copper-triethanolamine in reusable form.

EXAMPLE 4

Aqueous solution of the following copper complexes were prepared:
copper-triethanolamine
copper-tetrahydroxyethylenediamine
copper-monohydroxyethyltrihydroxypropylethylenediamine
copper-ethylenedinitrilotetraethanol
copper-nitrilotri-2-propanol The pH of each of the solutions was adjusted to a value of 5, and each solution was passed through an ion exchange column containing Amberlite IR-120 Plus exchange resin. Substantially all of the copper complex of each solution was retained on the column.

An aqueous solution of 5 percent sodium hydroxide was then passed through each of the columns, and substantially all of the copper complex in the column was released to the sodium hydroxide solution.

EXAMPLE 5

The procedure of Example 4 is repeated using complexes of cobalt and nickel with each of the complexing agents of Example 5. Substantially the same results are obtained.

EXAMPLE 6

An aqueous solution of copper-THPED complex was adjusted to a pH of 5.5 with sulfuric acid and passed through an ion exchange column containing Amberlite XE-318 chelating exchange resin. A 10% solution of sodium hydroxide was then passed through the column, and copper and THPED were released to the alkaline solution, thus reclaiming them from the column.

EXAMPLE 7

An electroless nickel bath was prepared using an admixture of the following:

| | |
|---|---|
| $NiCl_2$ | 15 g/l |
| Sodium hypophosphite | 10 g/l |
| Triethanolamine | 50 ml/l |
| NaOH and water (to 1 liter and pH of about 10) | |

Operation of the bath resulted in the formation of phosphites as by-products. The pH of effluent from the bath was adjusted with HCl to a value of between about 5 and 6, and using a procedure as in Example 1, nickel and triethanolamine were extracted from the pH-adjusted bath effluent, and removed from the ion exchange resin columns with a 5% aqueous sodium hydroxide solution.

EXAMPLE 8

An industrial metal cleaning solution is prepared by admixing the following:

|  | Amounts (oz.) |
| --- | --- |
| Mineral spirits* | 70.00 |
| Triethanolamine | 2.50 |
| Oleic acid | 5.00 |
| Ethylene glycol monobutyl ether (Butyl Cellosolve) | 1.25 |
| Pine Oil | 19.50 |

*A petroleum product, intermediate between gasoline and kerosene

The ingredients are mixed thoroughly, and 10 or more volumes of water are added.

The resulting mixture is sprayed over a copper metal surface to clean it and the sprayed cleaning solution is collected. The collected solution contains the original ingredients, small amounts of copper metal from the cleaned surface and copper-triethanolamine complex.

The copper-triethanolamine complex and free triethanolamine complexing agent are removed from the solution using cation exchange resin columns.

While the present invention has been described above with respect to a limited number of embodiments for the purpose of a full and detailed disclosure, it will be apparent to those skilled in the art that many other modifications and variatons of the present methods are also within the purview of the invention. Accordingly, this invention should not be construed as limited to the particulars set forth above.

I claim:

1. A method of separating alkali metal salt by-products of an electroless metal deposition bath from an alkanolamine complexing agent and a complex species of a heavy metal complexed with an alkanolamine complexing agent in an alkaline electroless metal deposition bath, said method comprising :
   a. lowering the pH of said alkaline bath or alkaline effluent thereof to render said alkanolamine complexed heavy metal and said alkanolamine complexing agent extractable by an ion exchange medium;
   b. contacting the pH-adjusted bath liquid of step (a) with an ion exchange medium capable of extracting said alkanolamine-complexed heavy metal and said alkanolamine complexing agent from the pH-adjusted bath liquid;
   c. removing from the exchange medium a bath liquid which comprises said alkali metal salt by-products and which is substantially free of said alkanolamine-complexed heavy metal and said alkanolamine complexing agent;
   d. removing said alkanolamine-complexed heavy metal and said alkanolamine complexing agent from the exchange medium, and
   e. returning said alkanolamine-complexed heavy metal and said alkanolamine complexing agent to an alkaline electroless metal deposition bath.

2. A method as defined in claim 1 wherein before step (a), the pH of the electroless metal deposition bath is in the range of from about 11 to about 13.5.

3. A method as defined in claim 1 wherein in step (a), the pH is lowered to a value of less than 11.

4. A method as defined in claim 3 wherein in step (a), the pH is lowered to a value in the range of from about 3 to about 7.5.

5. A method as defined in claim 1 wherein the alkanolamine complexing agent is selected from the group consisting of N, N, N', N'-tetrakis-(2-hydroxypropyl)-ethylenediamine, triethanolamine, ethylenedinitrilotetraethanol, nitrilotri-2-propanol, tetrahydroxyethylethylenediamine, monohydroxyethyl-trihydroxypropyl-ethylenediamine or mixtures thereof.

6. A method as defined in claim 5 wherein the complexing agent is N, N, N', N'-tetrakis-(2-hydroxypropyl)-ethylenediamine.

7. A method as defined in claim 1 wherein the heavy metal is selected from the group consisting of copper, nickel, cobalt, and alloys thereof.

8. A method as defined in claim 1 wherein the ion exchange medium is selected from the group consisting of cation exchange resins and ion exchange resins having a chelating functionality.

9. A method as defined in claim 8 wherein said cation exchange resin comprises a polystyrene resin having $-SO_3^-$ ionic groups.

10. A method as defined in claim 1 wherein the pH-adjusted bath liquid is sequentially contacted in step (b) with a cation exchange resin and an ion exchange resin having a chelating functionality.

11. A method as defined in claim 1 wherein the specific gravity of the bath or bath effluent prior to treatment in step (a) is no greater than 1.075.

12. A method as defined in claim 1 wherein in step (d), said complexed heavy metal and said complexing agent are removed from the exchange medium by an alkaline solution.

13. A method as defined in claim 1 wherein in step (d), said complexed heavy metal and said complexing agent are removed from the exchange medium by an electroless metal deposition bath or effluent therefrom.

14. A method of separating alkali metal salt by-products of an electroless copper deposition bath from an alkanolamine complexing agent and a complex species of copper complexed with an alkanolamine complexing agent in an alkaline electroless copper deposition bath, said method comprising:
   a. lowering the pH of said alkaline bath or alkaline effluent thereof to less than 11, to render said alkanolamine-complexed copper and said alkanolamine complexing agent extractable by an ion exchange medium;
   b. contacting the pH-adjusted bath liquid of step (a) with an ion exchange medium capable of extracting said alkanolamine-complexed copper and said alkanolamine complexing agent from the pH-adjusted bath liquid, said ion exchange medium being selected from the group consisting of cation exchange resins and chelating exchange resins;
   c. removing from said exchange medium a bath liquid comprises alkali metal salt by-products and which is substantially free of said alkanolamine-complexed copper and said alkanolamine complexing agent;
   d. removing said alkanolamine-complexed copper and said alkanolamine complexing agent from the exchange medium, and
   e. returning said alkanolamine-complexed copper and said alkanolamine complexing agent to an alkaline electroless metal deposition bath.

15. A method of separating alkali metal salt by-products of an electroless metal deposition bath from an alkanolamine complexing agent and a complex species of a heavy metal complexed with an alkanolamine complexing agent in an alkaline electroless metal deposition bath, said method comprising:
   a. lowering the pH of said alkaline bath or alkaline effluent thereof to render said alkanolamine complexed heavy metal and said alkanolamine complexing agent extractable by an ion exchange medium;

b. contacting the pH-adjusted bath liquid of step (a) with an ion exchange medium capable of extracting said alkanolamine-complexed heavy metal and said alkanolamine complexing agent from the pH-adjusted bath liquid;

c. removing from the exchange medium a bath liquid which comprises said alkali metal salt by-products and which is substantially free of said alkanolamine-complexed heavy metal and said alkanolamine complexing agent; and d. removing said alkanolamine-complexed heavy metal and said alkanolamine complexing agent from the exchange medium.

16. A method as defined in claim 15 wherein before step (a), the pH of the electroless metal deposition bath is in the range of from about 11 to about 13.5.

17. A method as defined in claim 15 wherein in step (a), the pH is lowered to a value of less than 11.

18. A method as defined in claim 17 wherein in step (a), the pH is lowered to a value in the range of from about 3 to about 7.5.

19. A method as defined in claim 15 wherein the alkanolamine complexing agent is selected from the group consisting of N, N, N', N'-tetrakis-(2-hydroxypropyl)-ethylenediamine, triethanolamine, ethylenedinitrilotetraethanol, nitrilo-tri-2-propanol, tetrahydroxyethylethylenediamine, monohydroxyethyltrihydroxypropyl-ethylenediamine or mixtures thereof.

20. A method as defined in claim 19 wherein the complexing agent is N, N, N', N'-tetrakis-(2-hydroxypropyl)-ethylenediamine.

21. A method as defined in claim 15 wherein the heavy metal is selected from the group consisting of copper, nickel, cobalt, and alloys thereof.

22. A method as defined in claim 15 wherein the ion exchange medium is selected from the group consisting of cation exchange resins and ion exchange resins having a chelating functionality.

23. A method as defined in claim 22 wherein said cation exchange resin comprises a polystyrene resin having —$SO_3^-$ ionic groups.

24. A method as defined in claim 15 wherein the pH-adjusted bath liquid is sequentially contacted in step (b) with a cation exchange resin and an ion exchange resin having a chelating functionality.

25. A method as defined in claim 15 wherein the specific gravity of the bath or bath effluent prior to treatment in step (a) is no greater than 1.075.

26. A method as defined in claim 15 wherein said complexed heavy metal and complexing agent are removed from the exchange medium by an alkaline solution.

27. A method of treating an aqueous alkaline solution comprising an alkanolamine complexing agent and a heavy metal complexed with an alkanolamine complexing agent, said method comprising:

a. lowering the pH of said alkaline solution to render the alkanolamine-complexed heavy metal and the alkanolamine complexing agent extractable by an ion exchange medium;

b. contacting the pH-adjust solution of step (a) with an ion exchange medium capable of extracting said alkanolamine-complexed heavy metal and said alkanolamine complexing agent from the pH-adjusted bath liquid;

c. discharging from the ion exchange medium a liquid which is substantially free of said alkanolamine-complexed heavy metal and said alkanolamine complexing agent; an d. regenerating the ion exchange medium.

28. A method as defined in claim 27 wherein in step (a), the pH is lowered to a value of less than 11.

29. A method as defined in claim 28 wherein in step (a), the pH is lowered to a value in the range of from about 3 to about 7.5.

30. A method as defined in claim 27 wherein the alkanolamine complexing agent is selected from the group consisting of N, N, N', N'-tetrakis-(2-hydroxypropyl)-ethylenediamine, triethanolamine, ethylenedinitrilotetraethanol, nitrilotri-2-propanol, tetrahydroxyethylethylenediamine, monohydroxyethyltrihydroxypropyl-ethylenediamine or mixures thereof.

31. A method as defined in claim 30 wherein the complexing agent is N, N, N', N'-tetrakis-(2-hydroxypropyl)-ethylenediamine.

32. A method as defined in claim 27 wherein the heavy metal is selected from the group consisting of copper, nickel, cobalt, and alloys thereof.

33. A method as defined in claim 27 wherein the ion exchange medium is selected from the group consisting of cation exchange resins and ion exchange resins having a chelating functionality.

34. A method as defined in claim 27 wherein the pH-adjusted bath liquid is sequentially contacted in step (b) with a cation exchange resin and an ion exchange resin having a chelating functionality.

* * * * *

UNITED STATES PATENT AND TRADEMARK OFFICE
CERTIFICATE OF CORRECTION

PATENT NO. : 4,076,618
DATED : February 28, 1978
INVENTOR(S) : Rudolph J. Zeblisky It is certified that error appears in the above-identified patent and that said Letters Patent are hereby corrected as shown below:

In Col. 10, line 50, after "liquid" and before "comprises", insert -- which --.

In Col. 12, line 16, "pH-adjust" should read -- pH-adjusted --; on line 24, "an" should read -- and --.

Signed and Sealed this

Eleventh Day of July 1978

[SEAL]

Attest:

RUTH C. MASON
Attesting Officer

DONALD W. BANNER
Commissioner of Patents and Trademarks